United States Patent [19]

Haynes

[11] Patent Number: 4,476,889

[45] Date of Patent: Oct. 16, 1984

[54] CONTROL VALVE AND SWITCH ASSEMBLY

[76] Inventor: Henry T. Haynes, 6463 S. 32nd W. Ave., Tulsa, Okla. 74123

[21] Appl. No.: 251,895

[22] Filed: Apr. 7, 1981

[51] Int. Cl.³ .............................................. G05D 16/20
[52] U.S. Cl. .................................. 137/116.3; 137/115; 239/126; 417/26; 417/44
[58] Field of Search ............................ 137/115, 116.3; 239/126; 417/26, 44

[56] References Cited

U.S. PATENT DOCUMENTS

| | | | |
|---|---|---|---|
| 3,195,556 | 7/1965 | Norstrud | 137/115 |
| 3,246,845 | 4/1966 | Techler | 239/126 X |
| 3,694,105 | 9/1972 | Martin | 417/26 |

*Primary Examiner*—Robert G. Nilson
*Attorney, Agent, or Firm*—Head, Johnson & Stevenson

[57] ABSTRACT

A control valve and switch assembly for automatic control of the pressure in a high pressure fluid system, such as in car washing apparatus, and comprising a housing having a fluid chamber therein providing communication between a pressure fluid source, such as a pump, and a fluid discharge valve, such as a spray nozzle, a fluid outlet passage provided in the housing in communication with the pressure chamber; a primary pressure switch secured to the housing and open to the pressure within the pressure chamber for selective opening and closing; the primary pressure switch being operably connected between a power supply and a motor starter for selective activation of the motor starter; an unloader valve in communication with the outlet passage and responsive to the pressure therein for selective opening to bleed excessive pressure from the pressure chamber to a fluid return line, and a secondary pressure switch secured to the housing and open to the return pressure; the secondary pressure switch being operably connected between the motor starter and a pump motor for activation of the pump in accordance with the pressure command conditions of the system and maintaining the system in an unloaded condition during inoperative periods.

6 Claims, 4 Drawing Figures

CONTROL VALVE AND SWITCH ASSEMBLY

BACKGROUND OF THE INVENTION

1. Field of the Invention

This invention relates to improvements in control devices for fluid control systems and more particularly, but not by way of limitation, to a control and sequence valve assembly to permit automatic pressure activated start and stop operation of a positive displacement pumping system, or the like.

2. Description of the Prior Art

Many industrial and commercial pressure spray washing devices are in widespread use today, such as those utilized for cleaning parts and equipment, car washing establishments, and the like. These devices normally comprise a shutoff valve associated with a high pressure spray head, nozzle, or the like provided at one end of a high pressure fluid conduit. High pressure fluid is normally present at the shutoff valve at all times in order to provide pressure fluid for the cleaning operation. Any time the shutoff valve is abruptly closed, there is usually considerable pressure surge in the system which is frequently damaging to the shutoff valve and associate equipment. In addition, most of these devices or systems are of the fluid recirculating type using a basic unloading device to divert fluid flow back to the fluid reservoir of the apparatus, and the components of the apparatus are subjected to considerable wear during the recirculating period since the operating parts do not actually stop functioning. The devices presently available for use with high pressure spray apparatus or systems do not solve these problems. For example, U.S. Pat. No. 3,920,040 shows a device which is simply a pressure sensing pilot valve for closing and opening a main system shutoff valve in response to unusual fluid pressures in the system; U.S. Pat. No. 4,186,766 shows a device similar to that shown in the aforementioned patent in that it is simply a pressure sensing pilot valve for closing and opening a main system shutoff valve, which in this case is part of the device itself; U.S. Pat. No. 4,188,971 discloses a simple pressure or flow activated shutoff valve; and U.S. Pat. No. 4,063,489 relates to another version of "velocity fuse", or a flow activated shutoff valve. All of the devices of the aforementioned patents are based on the need to shutoff or shutdown some part of a fluid flow system and particularly a downstream portion of the system wherein the unusual pressure or flow condition may exist. All of these devices must be used in conjunction with appropriate controls to start or stop the pressure source and to prevent overpressuring of the pressure source. None of the devices will control the pressure source in any way, nor will they prevent overpressuring of the pressure source, or start or stop the pressure source on command. They will not automatically shut the pressure source down in a ninety percent unload condition, or start the pressure source in a totally unloaded condition.

SUMMARY OF THE INVENTION

The present invention contemplates a novel control valve and switch assembly particularly designed and constructed for overcoming the foregoing disadvantages. The novel apparatus accomplishes, in a single unit, the control of the pressure source, the prevention of overpressure of the pressure source, the starting or stopping of the pressure source on command, the automatic shutdown of the pressure source in a ninety percent unloaded condition, and the starting of the pressure source in a totally unloaded condition. The novel assembly comprises a main housing having fluid passageways provided therein establishing communication between the pressure source and the shutoff or control valve as well as the return passage to the fluid reservoir. A spring urged unloader valve is interposed between the pressure source and fluid return passage for automatic control of fluid return, and a check valve is disposed downstream of the pressure source for precluding back flow of the fluid therethrough. A first or primary normally open pressure switch is operably connected between a power supply and motor starter and is open to the pressure within the housing and a secondary substantially identical normally closed pressure switch is operably connected between the motor starter and the pressure source and is open to the return line pressure downstream of the unloader valve. With the power source activated, and assuming the pressure conditions within the housing are below a selected maximum desirable operating pressure for the system the primary pressure switch will be in the normally open position, thus interrupting the flow of power to the pump motor. The system will thus be inactive until such time as the control valve, spray nozzle, or the like, is opened. With the opening of the control valve, the pressure within the system upstream of the unloader valve will fall below the selected minimum operating pressure for the system, and the primary pressure switch will automatically close to place the pump in operation. As the pressure rises above a selected minimum, the primary pressure switch will open and remain in the open condition throughout normal operation of the system. This will not effect the motor circuit, however, since continuity is maintained through the secondary pressure switch assembly which is closed through normal operation.

Upon shut off of the control valve the unloader valve will open for diverting pressure to the return line or passage and also activating the secondary pressure switch to an open position to stop the system. Thus, the pump will be closed down or shut off for ceasing the addition of fluid pressure into the system. Of course, the check valve will preclude the back flow of the high pressure fluid into the pump. When the pump ceases to function, substantially all of the fluid pressure in excess of the reset pressure of the unloader valve will bleed back through the open unloader valve, permitting the system to rest in an unloaded condition. The unloader valve will automatically close when the pressure drops below a preselected reset condition therefor. When the unloader valve closes, the return pressure will drop to substantially zero, whereupon the secondary pressure switch will return to the normally closed position to reconnect the pump motor with the motor starter. However, since the first or primary pressure switch is open, there will be no activation of the pump until the control valve is again opened. The startstop cycle of the novel assembly is automatic and repeats as the control valve requires the pressure control from the system. The novel assembly is simple and efficient in operation and economical and durable in construction.

DETAILED DESCRIPTION OF THE PREFERRED EMBODIMENT

Figure 1:
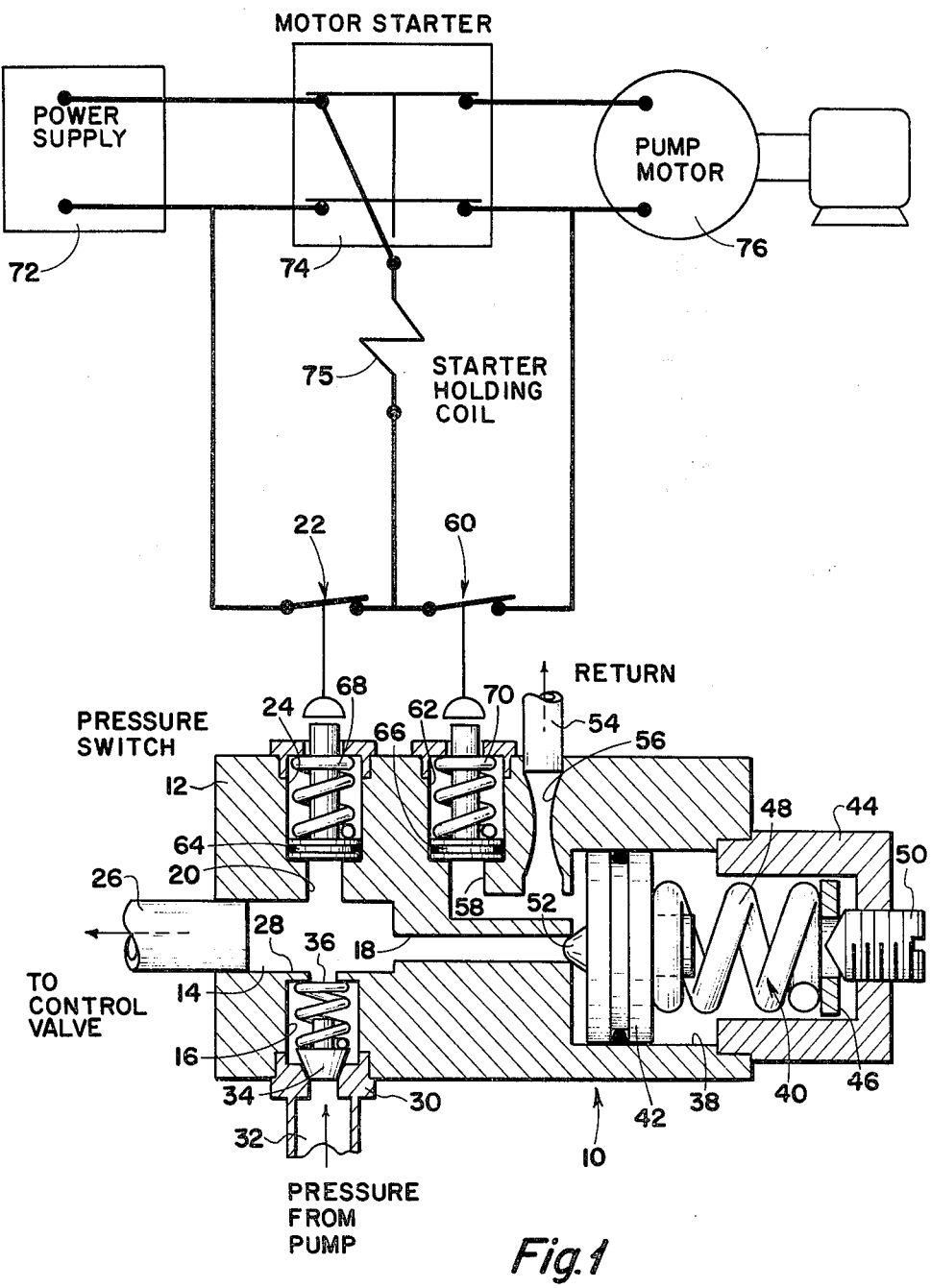
FIG. 1 is a sectional elevational view of a control valve and pressure switch assembly embodying the invention shown in combination with an operational electrical schematic therefor and illustrating one operational mode thereof.

Referring to the drawings in detail, reference character 10 generally indicates a novel control valve and switch assembly comprising a housing 12, having a pressure chamber 14 provided therein in open communication with an inlet bore 16 and an outlet passage 18. The chamber 14 is also open to a pressure bore 20, which is in constant communication with a suitable primary pressure switch 22 disposed within a bore 24 of the housing 12. The chamber 14 is open at one end to receive a suitable conduit 26, or the like, therein for directing pressure fluid to a suitable control valve (not shown), such as a spray head or nozzle, or the like.

An inwardly directed annular shoulder 28 is provided at the inner end of the bore 16, and a suitable valve seating member 30 is secured in the outer end thereof in any well known manner (not shown). The valve seat 30 is in communication with a suitable pressure source, such as a pump (not shown) through a line or passageway 32 for receiving the pressure fluid therefrom. A suitable check valve 34 is disposed within the bore 16 for cooperation with the valve seat 30 to provide open and closed positions therefor, and a suitable helical spring member 36 is anchored between the shoulder 28 and the valve 34 for constantly urging the valve member 34 in a direction toward the valve seat 30 to provide a normally closed position therefor.

The outlet passage 18 is in communication with an enlarged bore 38 provided in the housing oppositely disposed with respect to the chamber 14. A suitable spring urged unloader valve 40 is disposed within the bore 38 and is provided with a reciprocal piston member 42 having the outer periphery thereof in slidable sealing engagement with the inner periphery of the bore 38. A cap means 44 is secured in the open outer end of the bore 38 in any well known manner (not shown) for retaining the valve 40 in position, within the bore. The valve 40 is provided with a pressure plate 46 spaced outboard of the piston 42 and a suitable helical spring means 48 is anchored between the pressure plate 46 and the piston 42 for constantly urging the piston 42 directly toward the outlet passage 18. An adjustment screw 50, or the like, extends through the outer closed end of the cap member 44 and is in engagement with the pressure plate 46 for adjusting the force of the spring means 48 for a purpose as will be hereinafter set forth. In addition, the piston member 42 is provided with a centrally disposed axial extending projection member 52 in engagement with the outer end of the outlet passage 18 for selectively closing the communication between the outlet passage 18 and the bore 38.

The bore 38 is also in communication with a fluid return line 54 through a return passage 56 provided in the housing 12. Both the return passage 56 and bore 38 communicate with the bore 38 on the inboard side of the piston 42 for a purpose as will be hereinafter set forth. The return passage 56 is also in communication with a pressure bore 58, which is in constant communication with a secondary pressure switch 60. The pressure switch 60 is preferably substantially identical to the pressure switch 22, but not limited thereto, and both are well known, conventionally available switch assemblies. The switch 60 is suitably secured within a bore 62 provided within the housing 12. The switches 22 and 60 are provided with piston members 64 and 66, respectively, slidably disposed within the respective bores 24 and 62, and suitable helical spring members 68 and 70 are provided for each piston 64 and 68 for constantly urging the pistons toward a closed position with respect to the pressure bores 20 and 58.

The primary pressure switch 22 is operably connected between a suitable power supply 72, such as an electrical current line, and a suitable motor starter 74, or the like, for selective actuation of the motor starter, as is well known. It is preferable to interpose a suitable starter holding coil means 75 between the switch 22 and the motor starter. The secondary pressure switch 60 is operably connected between the motor starter 74 and a suitable pump motor 76, or the like, for selective activation of the pump motor, with the starter holding coil means 75 preferably being interposed between the motor starter 74 and the switch 60.

In use, the control valve and switch assembly 10 may be operably connected with substantially any suitable pressure fluid cleaning equipment, such as car washing equipment (not shown) with no special preparation being necessary for initiating the operation of the cleaning equipment. When the control valve, spray nozzle or the like (not shown) is opened, the pressure within the chamber 14 is reduced to a force less than the force of the spring means 68 of the primary pressure switch 22. The spring 68 then closes the switch 22 for operably connecting the motor starter 74 with the power supply 72. Since the return pressure at the bore 58 is substantially zero, as hereinbefore set forth, the spring means 70 of the secondary pressure switch 60 will hold the switch 60 in a closed position for operably connecting the pump motor 76 with the motor starter 74. Thus, the pump motor will be activated for actuation of the pump (not shown). The pump will then supply the pressure fluid to the chamber 14 through the check valve 34 whereupon the pressure fluid will be delivered through the control valve or spray nozzle in the usual manner for the cleaning operation. This operational mode for the assembly 10 is shown in FIG. 1.

Figure 2:
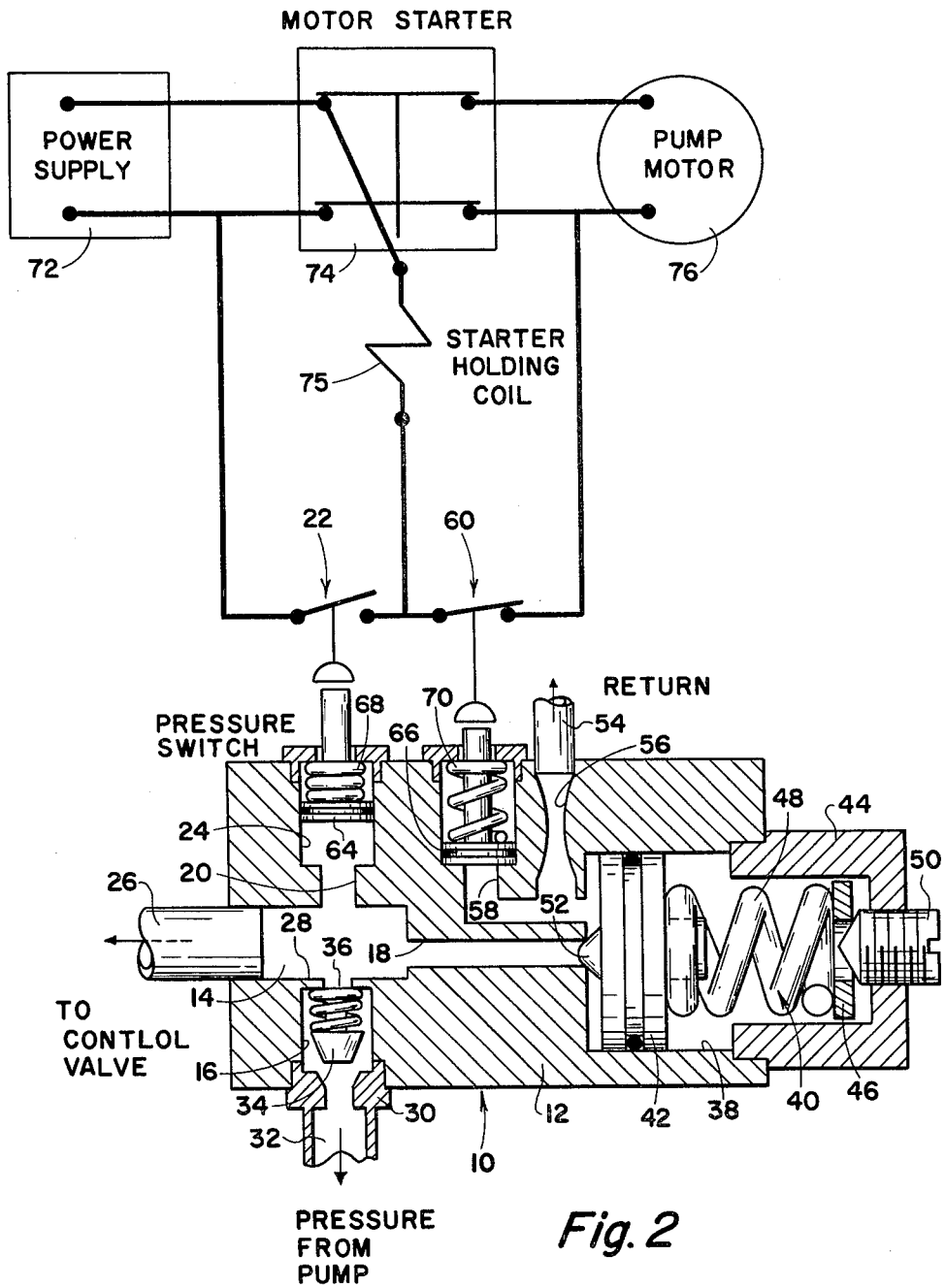
FIG. 2 is a view similar to FIG. 1 illustrating the next succeeding operational mode for the assembly.

As the fluid pressure within the chamber 14 reaches the selected desirable operational pressure for the cleaning equipment, the force of the spring means 68 of the primary pressure switch 22 will be overcome whereupon the spring 68 will open the switch 22 for opening the electrical circuit between the power supply 72 and motor starter 74. The electrical connection to the pump motor is maintained through the closed secondary pressure switch 60, and nothing further will happen during normal operation of the cleaning equipment. This operational mode of the assembly 10 is shown in FIG. 2.

Figure 3:
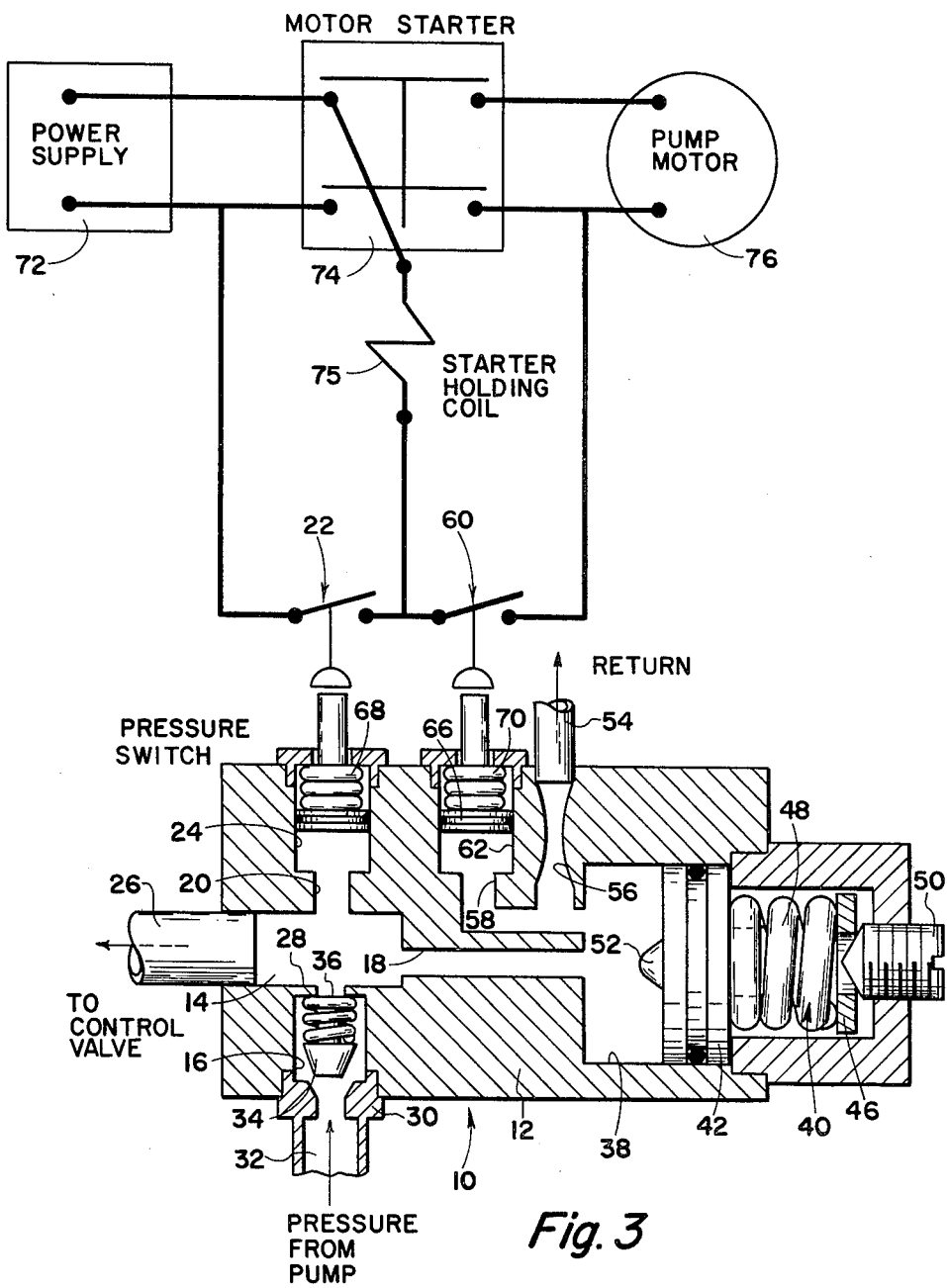
FIG. 3 is a view similar to FIGS. 1 and 2 illustrating a still further operational mode for the assembly.

If the pressure within the chamber 14 exceeds the selected maximum pressure for the cleaning system, as for example upon the abrupt closing of the spray nozzle, the increased fluid pressure will be delivered through the outlet passage 18 for overcoming the force of the spring means 48 of the unloader valve 40. The passage 18 is thus opened to communication with the return passage 56 through the bore 38 for returning the pressure fluid to the fluid reservoir (not shown). The return pressure is directed to the pressure bore 58, whereby the force of the spring means 70 is overcome for opening of the secondary pressure switch 60. This interrupts the electrical circuit of the pump motor 76 for stopping the actuation of the pump. This operational mode of the assembly 10 is shown in FIG. 3.

Figure 4:
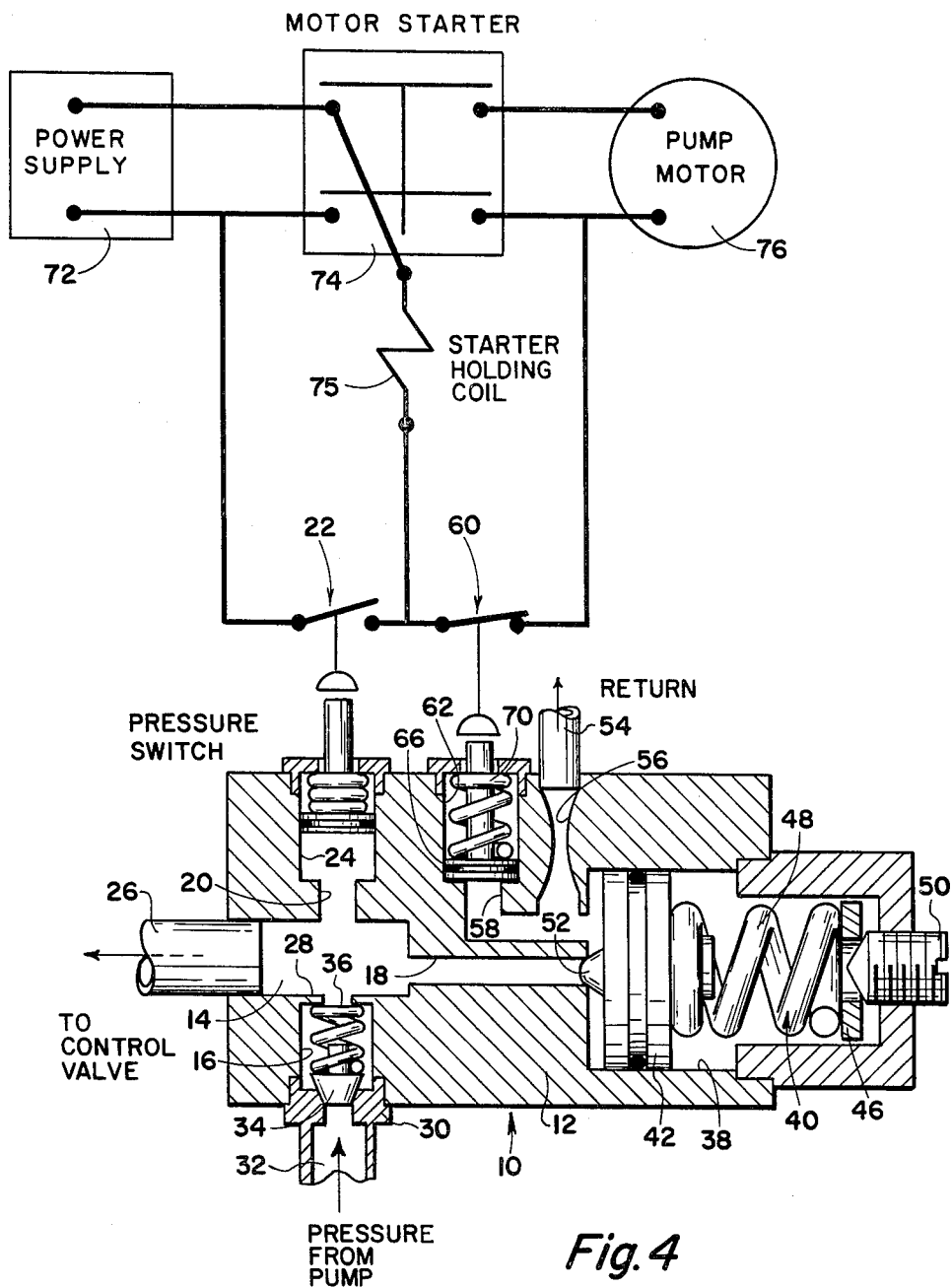
FIG. 4 is a view similar to FIGS. 1, 2 and 3 illustrating yet another operational mode for the assembly.

When the pressure fluid has been bled from the chamber 14 sufficiently for reducing the pressure to a force less than the force of the spring 48 of the unloader valve 40, the valve 40 will close. It is preferable that the force of the spring 48 be selected at approximately ten percent less than the normal operating pressure of the cleaning system, thus permitting the system to rest in an unloaded condition. When the unloader valve 40 closes, the pressure in the return passage 56 will be bled off through the return line 54, and the pressure at the pressure port 58 will be substantially zero. The secondary pressure switch 60 will then be automatically closed by the spring means 70, but since the primary switch 22 is still open, there will be no activation of the pump motor or pump. This operational mode of the assembly 10 is shown in FIG. 4.

Of course, it is to be noted that the force of the primary switch spring means is less than the reset force of the spring means 48 of the unloader valve 40, whereby the switch 22 will remain open at all times except when the pressure within the chamber 14 drops below the selected minimum operating pressure for the cleaning operation.

With the reopening of the control valve or spray nozzle, the start-stop cycle is repeated as the need arises.

From the foregoing it will be apparent that the present invention provides a novel control valve and switch assembly for a pressure fluid system wherein control of the pressure within the system is automatically controlled in a manner wherein the working parts of the fluid pressure system are protected from over pressure conditions and wear on the operational parts of the system is greatly reduced. The novel assembly provides operable connection between the pressure fluid source and the control valve of the pressure fluid system, with primary pressure disposed upstream of the control valve or spray nozzle means and responsive to pressure conditions upstream of the nozzle for automatically maintaining the operating condition at the desired or optimum fluid pressure. Upon excessive pressure increase in the novel assembly, the unloader valve of the assembly opens to bleed off the excessive pressure and simultaneously open the secondary pressure switch for ceasing the operation of the pumping equipment. The unloading valve closes upon reduction of the pressure to approximately ninety percent of the selected optimum operational pressure for the system, whereby the equipment is at rest in an unloaded condition. The start and stop cycling of the assembly is automatic and is responsive to the internal pressure conditions in the system for maintaining optimum operation and reducing wear and saving energy.

Whereas the present invention has been described in particular relation to the drawings attached hereto, it should be understood that other and further modifications, apart from those shown or suggested herein may be made within the spirit and scope of this invention.

What is claimed is:

1. A control valve and switch assembly comprising a housing, a pressure chamber provided in the housing for directing fluid for a work operation and in communication with a pressure source and an outlet passage, check valve means interposed between the pressure chamber and the pressure source for precluding back flow of fluid, pressure bore means provided in the housing and open to the pressure chamber, primary pressure switch means secured to the housing and open to the pressure bore, unloader valve means secured to the housing and open to the outlet passage, return passageway means provided in the housing in communication between the unloader valve means and a fluid return line, second pressure bore means provided in the housing in communication between the unloader valve means and a fluid return line, second pressure bore means provided in the housing and open to the return passageway means, secondary pressure switch means secured to the housing and open to the second pressure bore means, said primary pressure switch means being operably connected between a power supply and a motor starter and responsive to the pressure in the pressure chamber for alternately opening and closing the operable connection between the power supply and motor starter, said secondary pressure switch means being operably connected between the motor starter and a motor driven pump providing said pressure source and open to the pressure in the return passageway means downstream of the unloader valve means for alternately opening and closing the operable connection between the motor starter and the pump motor, and said unloader valve being responsive to the pressure in the outlet passage for providing selective communication between the outlet passage and the return passageway means for automatically controlling the pressure within the pressure chamber within predetermined operating limitations.

2. A control valve and switch assembly as set forth in claim 1 wherein the primary pressure switch means is responsive to all pressure within the pressure chamber below a preselected amount for closing the operable connection between the power supply and motor starter, and said secondary pressure switch means is responsive to all pressure within the return passageway means below a preselected amount for closing the operable connection between the motor starter and the pump motor for actuation of said pump to re-establish optimum operational fluid pressure to the pressure chamber.

3. A control valve and switch assembly as set forth in claim 2 wherein said primary pressure switch means is responsive to pressure within the pressure chamber above a preselected maximum operational pressure for opening the operable connection between the power supply and motor starter.

4. A control valve and switch assembly as set forth in claim 3 wherein the unloader valve is responsive to any pressure in the outlet passage in excess of a preselected maximum operational pressure for opening to establish communication between the outlet passage and the return passageway means for bleeding off the excessive pressure from the pressure chamber.

5. A control valve and switch assembly as set forth in claim 4 wherein the secondary pressure switch means is responsive to any pressure within the return passageway means in excess of a preselected maximum amount for opening the operable communication between the motor starter and the pump motor for precluding actuation of the pump motor.

6. A control valve and switch assembly as set forth in claim 5 wherein the unloader valve is provided with a reset pressure approximately ninety percent of the maximum operational pressure for closing in a manner, whereby the primary pressure switch means remains open and the secondary pressure switch means closes to maintain the inoperative system in an unloaded condition.

\* \* \* \* \*